United States Patent
Piscopo, Jr.

(10) Patent No.: US 10,972,906 B2
(45) Date of Patent: *Apr. 6, 2021

(54) MULTI-LINE MOBILE SERVICE WITH DYNAMIC MSISDN ASSOCIATION

(71) Applicant: T-Mobile USA, Inc., Bellevue, WA (US)

(72) Inventor: Robert F. Piscopo, Jr., Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/431,661

(22) Filed: Jun. 4, 2019

(65) Prior Publication Data

US 2019/0289460 A1  Sep. 19, 2019

Related U.S. Application Data

(63) Continuation of application No. 15/988,338, filed on May 24, 2018, now Pat. No. 10,334,429, which is a
(Continued)

(51) Int. Cl.
*H04W 8/06* (2009.01)
*H04W 8/10* (2009.01)
(Continued)

(52) U.S. Cl.
CPC ............. *H04W 8/26* (2013.01); *H04W 8/06* (2013.01); *H04W 8/10* (2013.01); *H04W 60/04* (2013.01);
(Continued)

(58) Field of Classification Search
CPC ........... H04W 8/06; H04W 8/26; H04W 8/10; H04W 60/04
See application file for complete search history.

(56) References Cited

U.S. PATENT DOCUMENTS 5,448,622 A * 9/1995 Huttunen ............... H04M 1/677
455/551
8,406,758 B2   3/2013 Tagg et al.
(Continued)

FOREIGN PATENT DOCUMENTS

CN   101390409   3/2009
CN   102640526   8/2012
(Continued)

OTHER PUBLICATIONS

European Office Action dated Mar. 7, 2019 for European Patent Application No. 16780465.7, a counterpart of U.S. Pat. No. 9,992,667, 5 pages.
(Continued)

*Primary Examiner* — Marisol Figueroa
*Assistant Examiner* — Farideh Madani
(74) *Attorney, Agent, or Firm* — Lee & Hayes, P.C.

(57) ABSTRACT

A network device receives a location update message from a mobile network switch. The location update message indicates that a mobile device is registered with the mobile network switch. The location update message includes an international mobile subscriber identity (IMSI) associated with the mobile device. The network device determines, based at least on the IMSI, a plurality of MSISDNs associated with the mobile device, including a first MSISDN that is enabled for calling and a second MSISDN that is not enabled for calling. The network device transmits, in response to the location update message, subscriber data to a database associated with the mobile network switch, which associates the IMSI with the first MSISDN.

20 Claims, 5 Drawing Sheets

Related U.S. Application Data continuation of application No. 14/686,388, filed on Apr. 14, 2015, now Pat. No. 9,992,667.

(51) Int. Cl.
  *H04W 8/26* (2009.01)
  *H04W 60/04* (2009.01)
  *H04W 8/04* (2009.01)
  *H04L 29/12* (2006.01)
  *H04W 8/18* (2009.01)
  *H04W 88/14* (2009.01)
  *H04W 88/00* (2009.01)

(52) U.S. Cl.
  CPC ........ *H04L 61/605* (2013.01); *H04L 61/6054* (2013.01); *H04W 8/04* (2013.01); *H04W 8/18* (2013.01); *H04W 8/183* (2013.01); *H04W 88/005* (2013.01); *H04W 88/14* (2013.01)

(56) References Cited

U.S. PATENT DOCUMENTS

| | | | |
|---|---|---|---|
| 9,992,667 B2* | 6/2018 | Piscopo, Jr. | H04W 8/06 |
| 2005/0192035 A1* | 9/2005 | Jiang | H04W 8/26 455/461 |
| 2009/0029684 A1 | 1/2009 | Rosenblatt et al. | |
| 2010/0304705 A1 | 12/2010 | Hursey | |
| 2012/0275442 A1 | 11/2012 | Malets et al. | |
| 2012/0282924 A1* | 11/2012 | Tagg | H04W 48/18 455/432.1 |
| 2013/0288657 A1* | 10/2013 | Huang | H04W 48/02 455/418 |
| 2014/0242951 A1 | 8/2014 | Mohammed et al. | |
| 2018/0270651 A1 | 9/2018 | Piscopo, Jr. | |

FOREIGN PATENT DOCUMENTS

| | | |
|---|---|---|
| CN | 103379560 | 10/2013 |
| EP | 1854318 | 11/2007 |
| EP | 1982539 | 10/2008 |
| WO | WO2007089755 | 8/2007 |
| WO | WO2012080781 | 6/2012 |

OTHER PUBLICATIONS

Extended European Search Report dated Jul. 24, 2018 for European patent application No. 16780465.7, 11 pages.

Office Action for U.S. Appl. No. 15/988,338, dated Oct. 9, 2018, Piscopo et al, "Multi-Line Mobile Service With Dynamic MSISDN Association", 15 pages.

Office action for U.S. Appl. No. 14/686,388, dated Feb. 15, 2017, Piscopo Jr., "Multi-Line Mobile Service With Dynamic MSISDN Association", 20 pages.

Office action for U.S. Appl. No. 14/686,388, dated Sep. 6, 2017, Piscopo Jr., "Multi-Line Mobile Service With Dynamic MSISDN Association", 23 pages.

Office action for U.S. Appl. No. 14/686,388, dated Sep. 8, 2016, Piscopo Jr., "Multi-Line Mobile Service With Dynamic MSISDN Association", 17 pages.

PCT Search Report and Written Opinion dated Sep. 21, 2016 for PCT application No. PCT/US2016/026030, 13 pages.

Translated Chinese Office Action from the China National Intellectual Property Administration for Application No. 201680021677.0, dated Jul. 21, 2020, a counterpart of U.S. Pat. No. 9,992,667, 26 pages.

* cited by examiner

MULTI-LINE MOBILE SERVICE WITH DYNAMIC MSISDN ASSOCIATION

CROSS-REFERENCE TO RELATED APPLICATION

This application is a continuation of, and claims priority to, U.S. patent application Ser. No. 15/988,338, filed on May 24, 2018, which is a continuation of U.S. patent application Ser. No. 14/686,388, entitled "MULTI-LINE MOBILE SERVICE WITH DYNAMIC MSISDN ASSOCIATION", filed on Apr. 14, 2015, the entirety of which are incorporated herein by reference.

BACKGROUND

A GSM phone includes a subscriber identity module (SIM) card, which has an international mobile subscriber identity (IMSI) stored thereon. An IMSI is a unique 64-bit number. Within a GSM network, the IMSI is associated with the MSISDN, sometimes referred to as the "Mobile Station International Subscriber Directory Number," or colloquially as the telephone number. The MSISDN is a unique number that identifies a subscription on the GSM network and is also the number that can be used to place a call to the GSM phone. The MSISDN is not necessarily stored on the SIM card or the phone, and the MSISDN is not permanently associated with the IMSI. The MSISDN may change if the subscription changes, for example.

In a typical GSM phone registration situation, the phone registers with a mobile switching center (MSC), and a visitor location register (VLR) is updated. After the registration authentication procedure is completed, the MSC/VLR sends a location update mobile application part (MAP) message to a home location register (HLR) with the IMSI of the phone that is registered. The HLR replies back with a MAP insert subscriber (ISD) message that provides subscription information to the MSC/VLR including the MSISDN.

When a call comes into the GSM network, it passes through a gateway MSC, which sends out a send routing information (SRI) message to the HLR that the phone is registered with. The HLR sends a provide roaming number (PRN) message to the MSC where the user device is registered, the MSC sends back a mobile station roaming number (MSRN), and the HLR sends the MSRN as a response to the SRI. The MSRN is a temporary number that the MSC/VLR maps to the MSISDN. The gateway MSC routes the call to the MSC that the called party is registered on using the MSRN.

To enable multi-line services—such as two phone numbers for one mobile phone—a dual SIM phone may be used. The SIM stores two IMSIs, and registers one or both of them with the MSC/VLR, depending on the mode of the phone.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

In embodiments of the present disclosure, a proxy is introduced into a telecommunications network, such as a global system for mobile communications (GSM) network, to enable multi-line service (multiple phone numbers and subscriptions) to be associated with a single IMSI and a single mobile device. The proxy is associated with IMSIs of mobile devices that have multi-line service. A database associated with the proxy houses the user associations, including the pairings of IMSIs and MSISDNs to a single user or a single mobile device, and indicates which MSISDNs are currently active (e.g., which MSISDNs the IMSI is authorized to use) and which are currently enabled for calling (or "in focus") on the mobile device. Some component of the phone, either an application or an operating system component, enables the selection of a particular MSISDN to be enabled. In other words, the user or application can select a telephone number for outbound calls.

Figure 1:
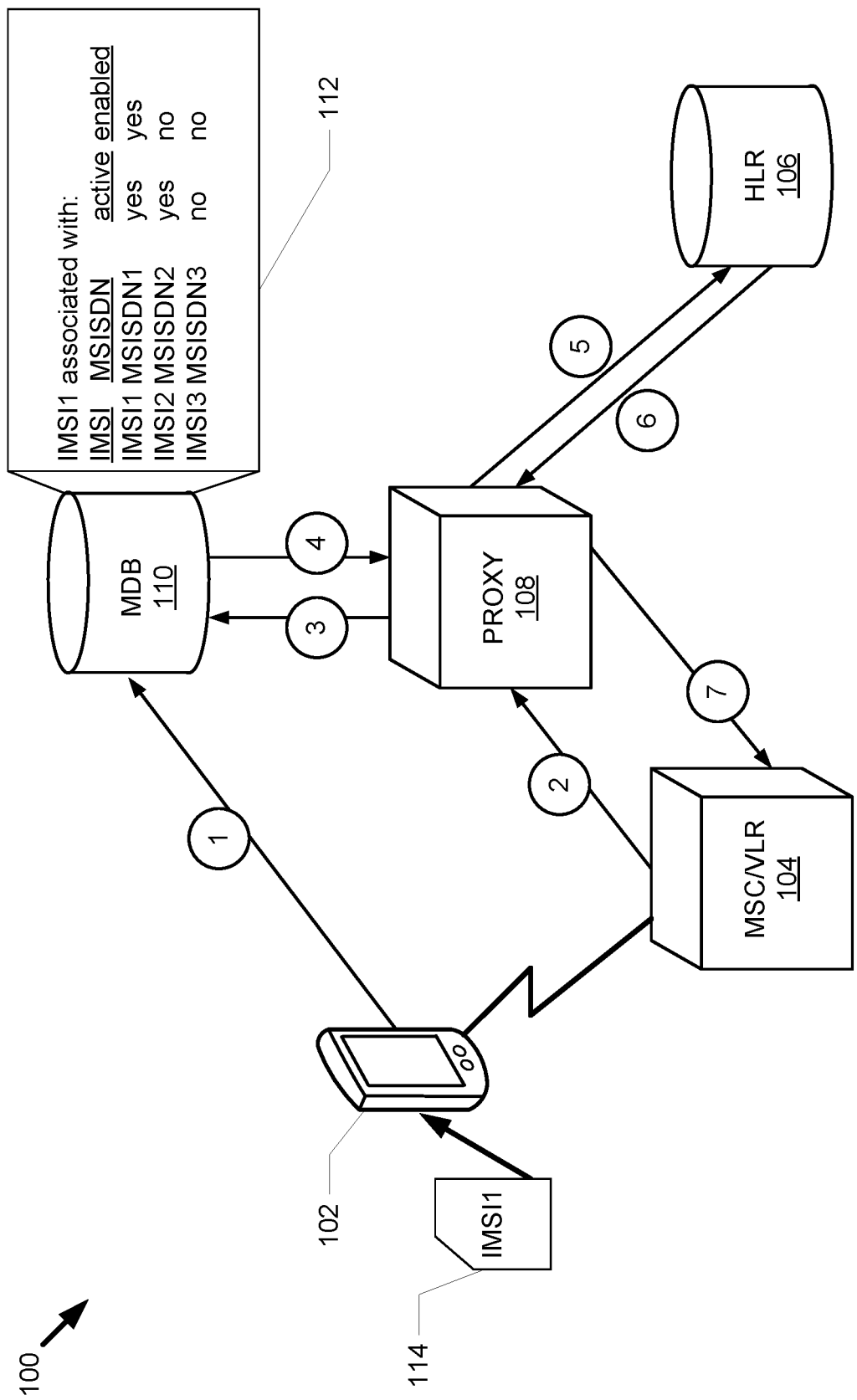
FIG. 1 illustrates a network and a process for multi-line mobile device registration with dynamic MSISDN association.

FIG. 1 illustrates a network 100 and a process for multi-line mobile device registration with dynamic MSISDN association. User equipment (UE) 102 at some point wirelessly connects to and registers with a MSC/VLR 104. During registration the UE 102 provides its IMSI to the MSC/VLR 104. In a conventional registration, the MSC/VLR sends a MAP location update (LUP) message to an HLR 106 and the HLR 106 responds with a MAP ISD message providing the MSISDN and other subscription information. The VLR is a database associated with the MSC. The VLR and the MSC may be housed together, or separately. In embodiments shown herein, the MSC and the VLR are shown together for the sake of illustration only.

The UE 102 is associated with two or more MSISDNs on the network 100. At some point, a Multiline Services Database (MDB) 110 may be updated to reflect that a particular MSISDN associated with the UE 102 is enabled for calling (this is shown in FIG. 1 with an arrow labeled with a circled "1"). Various mechanisms may be employed to change the MSISDN that is enabled for calling. The update may be based on an application programming interface (API) call placed from the UE 102 to the MDB 110 or to the proxy 108, or to another device. The update may be based on placement of an inbound call, as discussed in more detail in FIG. 4. The update may occur for some other reason, such as based on a time-of-day, day-of-week setting, or based on some other setting. The MDB 110 is configured to store information associating a plurality of MSISDNs with a UE and/or with a user, such as the UE 102. The database is further configured to store an indication of a MSISDN of the plurality of MSISDNs that is currently enabled for calling.

In the example shown in FIG. 1, MSISDN1 is enabled for calling, MSISDN2 is active but not enabled for calling, and MSISDN3 is inactive and also not enabled for calling. Active as used herein means that the subscription and associated MSISDN is currently available for inbound and outbound calls, and can be enabled either through user action or automatically in some circumstances, such as based on an incoming call to that MSISDN. An incoming phone call placed to an active but not enabled MSISDN causes the MSISDN to become enabled and the call is placed to the UE 102 (this is shown in more detail in FIG. 4). A phone call placed to an inactive MSISDN—such as MSISDN3—will not cause the inactive MSISDN to become enabled for calling, and the call will not be placed to the UE 102. The same or similar is true for other mobile GSM services, such as short message service (SMS). A voice call or SMS message placed or sent from the UE 102 will be placed to or sent from the MSISDN that is currently both active and enabled.

In the example illustrated in FIG. 1, database portion 112 shows that IMSI1—which is the IMSI stored on a SIM 114 within the UE 102—is associated with three IMSIs (IMSI1, IMSI2, and IMSI3) and three MSISDNs (MSISDN1, MSISDN2, and MSISDN3).

In embodiments of the present disclosure, when the UE 102 registers with the MSC/VLR 104, the MSC/VLR 104 sends a MAP LUP message to a proxy 108 to register the IMSI with the HLR (shown in FIG. 1 with a circled "2"). In embodiments, the proxy 108 emulates the HLR 106 when communicating with the MSC/VLR 104. Emulation of the HLR 106 means in part that the proxy 108 is configured to engage in various protocol communications as if it were an HLR according to relevant standards, such as the relevant GSM standards.

The proxy 108 determines, based at least on the IMSI in the MAP LUP message, a plurality of MSISDNs associated with the UE 102, including for example a first MSISDN that is enabled for calling and a second MSISDN that is not enabled for calling. In the example shown in FIG. 1, the proxy 108 performs a look-up to the MDB 110 to determine the MSISDN that is currently enabled and also to determine all active MSISDNs associated with the IMSI (shown in FIG. 1 with a circled "3"). The MDB 110 provides the MSISDN/IMSI pairings associated with the UE 102 and IMSI1, as well as an indication of the MSISDN that is enabled (shown in FIG. 1 with a circled "4").

The proxy 108 sends MAP LUP messages to the HLR 106 for all active MSISDNs associated with UE 102 (shown in FIG. 1 with a circled "5"). In the example shown in FIG. 1, there are two active MSISDNs—MSISDN1 and MSISDN2—associated with IMS1 and UE 102 in the MDB 110. Thus, the proxy 108 sends two MAP LUP messages to the HLR 106, one for IMSI1 and another IMSI2. By doing so, the HLR 106 registers both IMSI1 and IMSI2 with the proxy 108. The proxy 108 emulates a MSC/VLR in this communication with the HLR 106, thereby causing the HLR 106 to "think" that the proxy 108 is a MSC/VLR that has registered both IMSI1 and IMSI2. Emulation of the MSC/VLR 104 means in part that the proxy 108 is configured to engage in various protocol communications as if it were an MSC/VLR according to relevant standards, such as the relevant GSM standards. Although the SIM 114 of the UE 102 only has a single IMSI—IMSI1—stored thereon, multiple ISIs are stored in the MDB 110, and transmitted to the HLR 106 in the MAP LUP messages in part to conform to the relevant standards which may provide that there is a single IMSI/MSISDN pairing, and also so that the HLR 106 need not have additional logic that allows it to handle multiple MSISDNs paired with a single IMSI.

The HLR 106 responds to the MAP LUP messages with MAP ISD messages for all MSIDN/IMSI pairs associated with the UE 102 (shown with a circled "6") in FIG. 1). The MAP ISD messages include subscriber data for those MSISDNs, including the MSISDNs themselves. The proxy 108 determines the MSISDN that is currently enabled (or "in focus") on the UE 102. The proxy 108 emulates an HLR in its communications with the MSC/VLR 104. The proxy 108 transmits subscriber data associated with the MSISDN that is currently enabled for calling, and may not transmit subscriber data associated with a MSISDN that is not currently enabled. For example, the proxy 108 transmits a MAP ISD message for the MSISDN that is currently enabled for calling (shown in FIG. 1 with a circled "7"). In this way, the proxy 108 causes the MSC/VLR 104 to associate that subscriber information in the MAP ISD message (including the currently enabled MSISDN) with the IMSI stored in the UE 102 (in this example, IMSI1 is associated with MSISDN1).

Any outbound call from that UE 102 is placed using the MSISDN that is currently enabled, and associated with the IMSI on the MSC/VLR 104. While MSISDN1 is enabled, and associated with IMSI1 in the MSC/VLR 104, any call detail records produced for billing purposes would be produced for MSISDN1 and the associated subscription. Were IMSI2 enabled—instead of IMSI1—proxy 108 would transmit the MAP ISD message for MSISDN2, and the MSC/VLR 104 would associate IMSI1 with MSISDN2. Any call detail records produced for billing purposes would be produced for MSISDN2.

The network 100 may support one or more of Global System for Mobile Communications (GSM) protocols or standards. The UE 102 may be any number of wireless devices, such as mobile telephone handsets, tablet computers, wireless modems, personal computers, laptops, and so forth. The network 100 may provide to the wireless end-user devices one or more of voice service, video service, data service, messaging service (e.g., short messaging service (SMS), multimedia messaging service (MMS)), or other wireless services.

Figure 2:
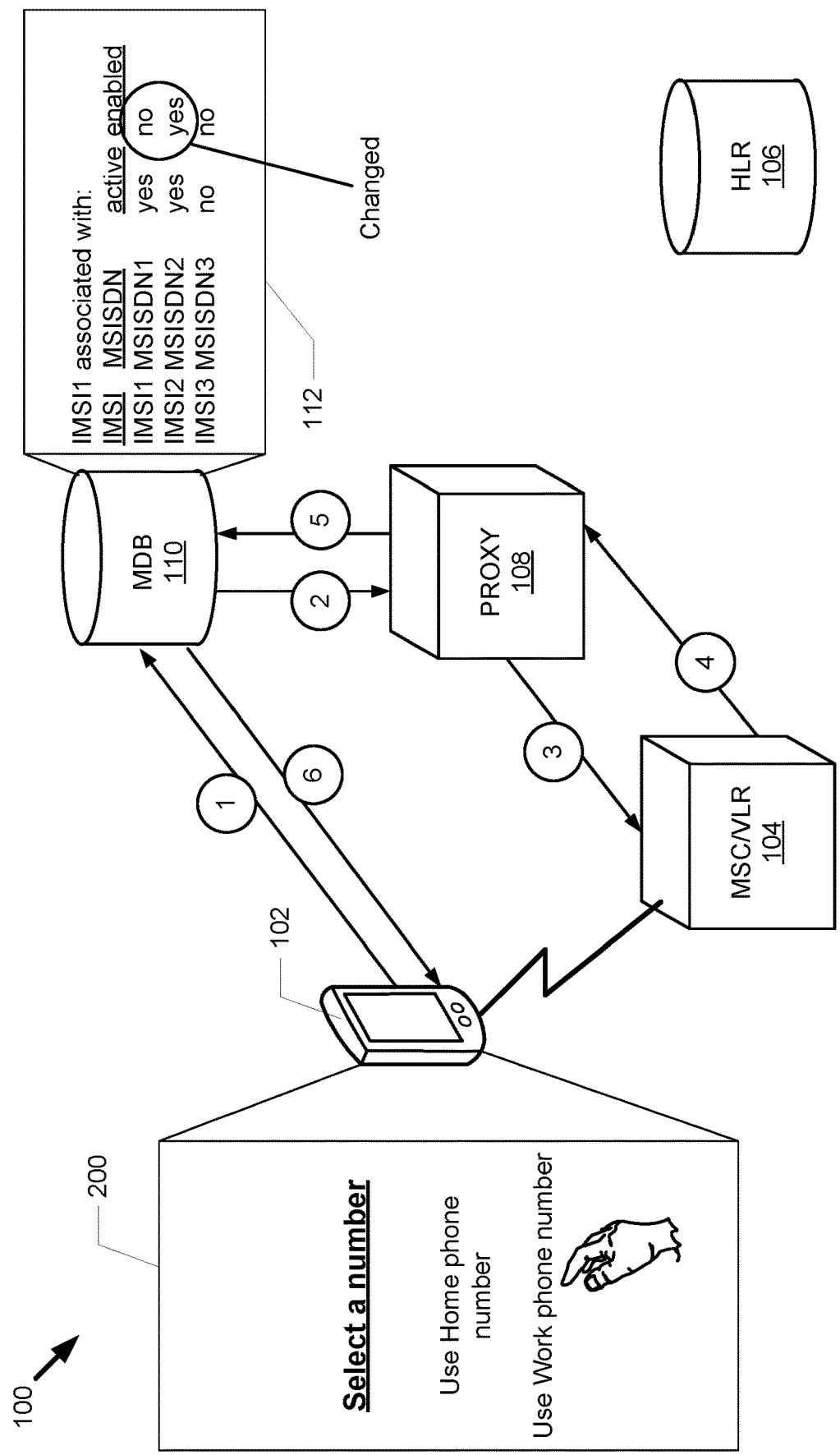
FIG. 2 illustrates a network and a process for dynamic update of MSISDN association.

FIG. 2 illustrates a network 100 and a process for dynamic update of MSISDN association. As noted above, the UE 102 may change the MSISDN that is enabled for calling in various ways, such as by calling an API to the MDB 110, the proxy 108, or to some other device, or in some other way. In the example shown in FIG. 2, a user taps on a touch screen 200 which causes an application executing on the UE 102, or an operating system component of the UE 102, to select a new MSISDN to be enabled. Regardless of the mechanism by which the change is initiated, the UE 102 sends a message (or causes a message to be sent) to request that a different MSISDN be enabled, such as enabling IMSI2 (shown in FIG. 2 with a circled "1"). The MDB 110 updates portion 112 to reflect that MSISDN2 is enabled. The proxy 108 receives an indication of a change to enable one MSISDN and to disable another MSISDN. In the example illustrated in FIG. 2, this change is communicated to the proxy 108 (shown with a circled "2"). The proxy 108 may periodically poll the MDB 110 for changes, the MDB 110 may push changes to the proxy 108, or the change may be communicated in some other way.

The proxy 108 updates the MSC/VLR 104 based on the indication of the change in the enabled MSISDN. The proxy 108 transmits a new MAP ISD profile message for MSISDN2 to the MSC/VLR 104 updating the MSC/VLR 104 with the new subscriber information, including the now enabled MSISDN2 (shown with a circled "3"). In this way, the proxy 108 causes the MSC/VLR 104 to associate IMSI1 with MSISDN2 (in this example), and an outbound call placed from the UE 102 may now be made using the subscription associated with MSISDN2. The MSC/VLR 104 replies to the MAP ISD profile message with a MAP ISD response message (shown with a circled "4" in FIG. 2). In this interaction, the proxy 108 emulates an HLR, such as the HLR 106.

The proxy 108 causes a message to be sent to the UE 102 indicating that the change to enable MSISDN2 is completed. In the example shown in FIG. 2, the proxy 108 transmits a "done" message to the MDB 110 (shown with a circled "5") and the MDB 110 transmits a "done" message to the UE 102 (shown with a circled "6"). However, in other embodiments, the change may be communicated to the UE 102 in some other way, such as directly from the proxy 108 to the UE 102, through some other intermediary, or in some other way.

Figure 3:
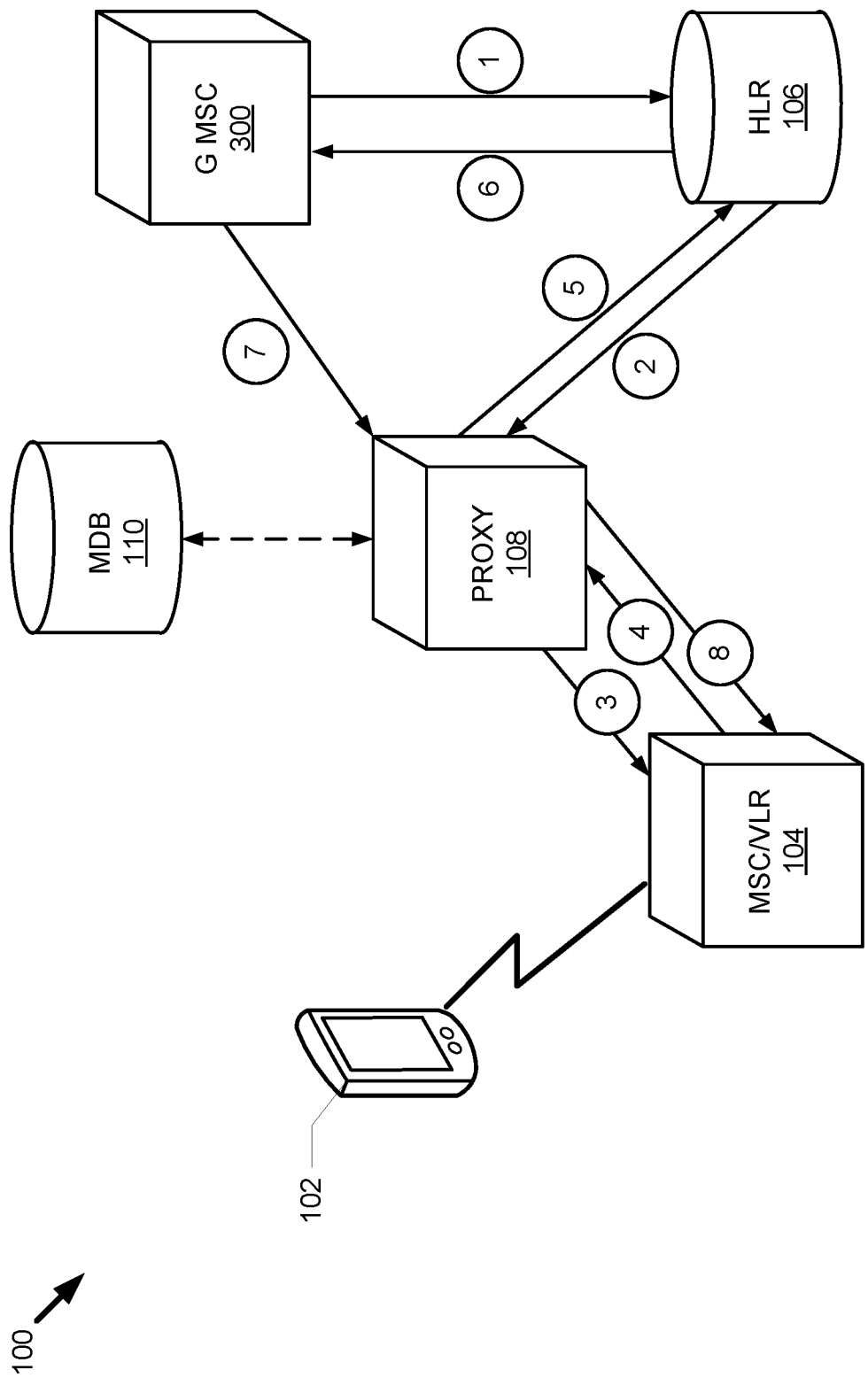
FIG. 3 illustrates a network for incoming call handling for call to a currently enabled MSISDN.

FIG. 3 illustrates a network 100 and a process for incoming call handling for a call to a currently enabled MSISDN. When a call comes in, a gateway MSC 300 requests routing information for the MSISDN. In the example shown in FIG. 3, the gateway MSC 300 sends a send routing information (SRI) message to the HLR 106 (shown in FIG. 3 with a circled "1"). The SRI message specifies the MSISDN that is being called, for example MSISDN2. The HLR 106 associates the MSISDN being called with the proxy 108, due to previous registration of an IMSI (such as IMSI2) associated with the MSISDN being called during the registration process, such as is illustrated in FIG. 1. The HLR 106 therefore sends a provide roaming number (PRN) message to the proxy 108 (shown with a circled "2" in FIG. 3). The proxy 108 receives this request to provide routing information for the incoming call associated with the MSISDN. As with other communications between the HLR 106 and the proxy 108, the proxy 108 emulates a MSC/VLR in its communication with the HLR 106.

The proxy 108 determines whether the MSISDN being called is currently enabled for calling. The proxy 108 may maintain the active and enabled MSISDNs for UE 102 (and other UEs), such as in working memory or some other local memory, which may enable faster retrieval than performing a look-up to the MDB 110. For example, in the registration process illustrated in FIG. 1, the proxy 108 learns of the currently enabled MSISDN when the UE 102 registers with the MSC/VLR 104. In the example illustrated in FIG. 2, the proxy 108 learns of the currently enabled MSISDN when the currently enabled MSISDN is changed. If for some reason the proxy 108 does not know what MSISDN is currently enabled, it may perform a look-up to the MDB 110 (shown in FIG. 3 with a dashed line). The proxy 108 may, in some embodiments, perform a look-up to the MDB 110 every time a call comes in.

Where the MSISDN being called is currently enabled (as in FIG. 3), the proxy 108 transmits a request for the routing information to the MSC/VLR 104. In the example shown in FIG. 3, the proxy 108 sends the PRN (provide roaming number) message to the MSC/VLR 104 (shown in FIG. 3 with a circled "3"). The MSC/VLR 104 responds to the PRN message with a MSRN (shown in FIG. 3 with a circled "4"). The proxy 108 receives this routing information. As noted above, the MSRN is a temporary number mapped to the MSISDN for a period of time, and is used for call routing purposes. The MSC/VLR 104 stores the MSRN temporarily. As with other communications between the proxy 108 and the MSC/VLR 104, the proxy 108 emulates an HLR in these communications.

The proxy 108 allocates its own MSRN which it then maps to the MSRN received from the MSC and transmits the routing information to the HLR 106. In the example shown in FIG. 3, the proxy 108 transmits the MSRN to the HLR 106 (shown in FIG. 3 with a circled "5"). The HLR 106 sends the MSRN to the gateway MSC 300 as a reply to the SRI message (shown in FIG. 3 with a circled "6"). To establish the call, the gateway MSC 300 sends a SIP INVITE to the MSRN which would subsequently be routed to the proxy 108 (shown with a circled "7" in FIG. 3). In this communication, the proxy 108 emulates a MSC/VLR to the gateway MSC 300. The proxy 108 maps the MSRN back to the MSRN originally allocated by the MSC and sends a SIP INVITE to the MSC's MSRN which subsequently gets routed to the MSC/VLR 104 (shown with a circled "8") in FIG. 3. Alternatively, the call might be set up through a Signaling System No. 7 (SS7) network using an ISDN User Part (ISUP) Initial address message (IAM) to place the call. Also, the network operator could elect to not have the Proxy map the MSRN to its own to interwork the call and simply forward the MSRN sent by the MSC to the HLR. In this case the call would be routed to the MSC/VLR 104 that the MSRN came from, and would not traverse the proxy. The MSC/VLR 104 then sets up the call with the UE 102.

Figure 4:
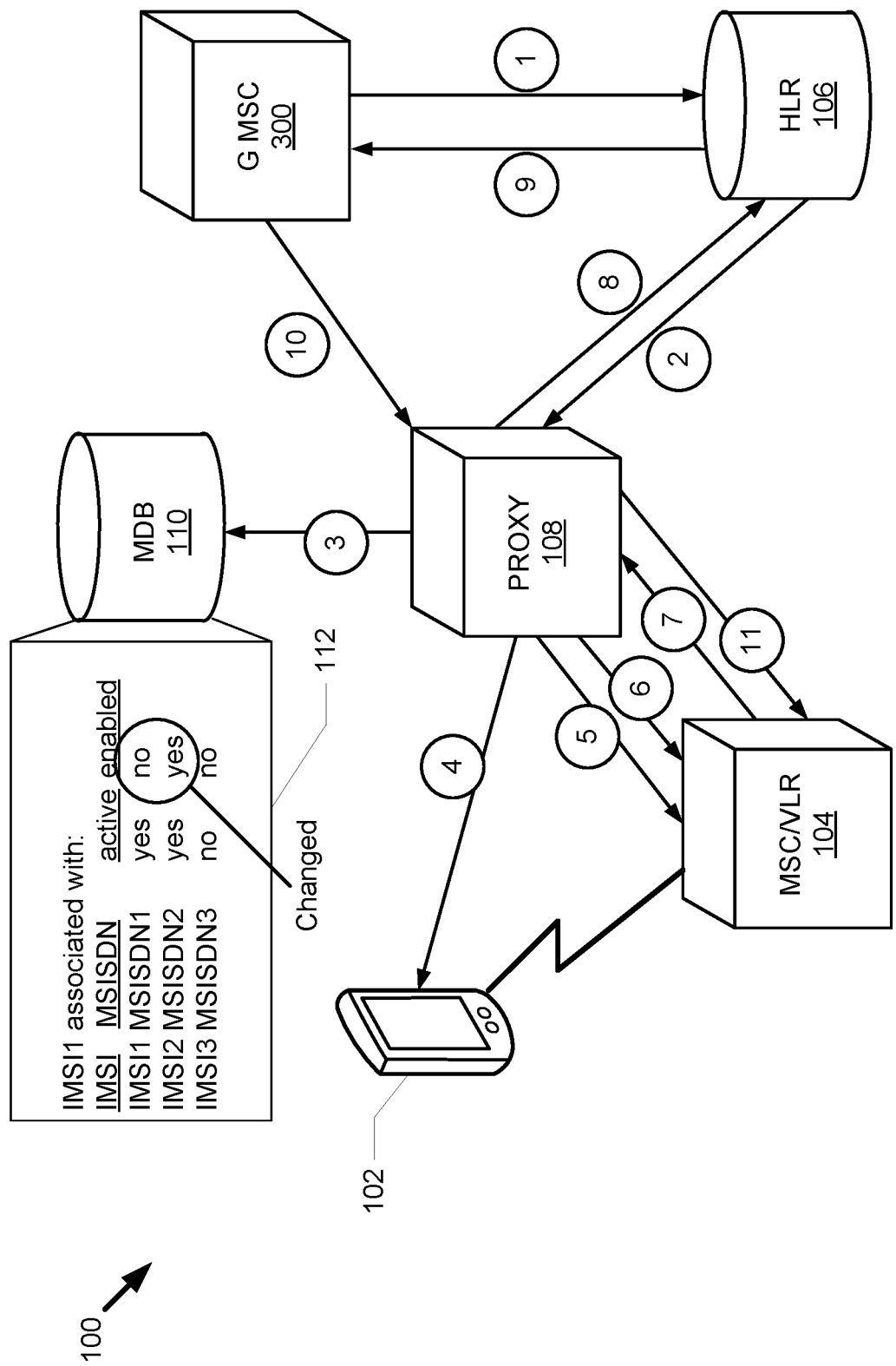
FIG. 4 illustrates a network and a process for incoming call handling with dynamic update of MSISDN association.

FIG. 4 illustrates a network 100 and a process for incoming call handling with dynamic update of MSISDN association. In the example illustrated in FIG. 3, the MSISDN being called is currently enabled for calling. In the example illustrated in FIG. 4, the MSISDN being called is not currently enabled. When a call comes in, a gateway MSC 300 requests routing information for the MSISDN by transmitting a send routing information (SRI) message to the HLR 106 (shown in FIG. 4 with a circled "1"). The SRI message specifies the MSISDN that is being called, for example MSISDN2. The HLR 106 associates the MSISDN being called with the proxy 108, due to previous registration of the IMSI associated with the MSISDN being called during the registration process, such as is illustrated in FIG. 1. The HLR 106 sends a provide roaming number (PRN) message to the proxy 108 (shown with a circled "2" in FIG. 4). The proxy 108 receives this request for routing information for the MSISDN. As with other communications between the HLR 106 and the proxy 108, the proxy 108 emulates a MSC/VLR in its communication with the HLR 106.

The proxy 108 determines whether the MSISDN being called is currently enabled for calling. The proxy 108 may maintain the active and enabled MSISDNs for UE 102 (and other UEs), such as in working memory or some other memory as discussed above with respect to FIG. 3. For example, in the registration process illustrated in FIG. 1, the proxy 108 learns of the currently enabled MSISDN when the UE 102 registers with the MSC/VLR 104. In the example illustrated in FIG. 2, the proxy 108 learns of the currently enabled MSISDN when the currently enabled MSISDN is changed. If for some reason the proxy 108 does not know what MSISDN is currently enabled, it may perform a look-up to the MDB 110. The proxy 108 may, in some embodiments, perform a look-up to the MDB 110 every time a call comes in.

When a call comes in for a MSISDN that is not currently enabled for calling (as in FIG. 4), the proxy 108 takes one or more steps to change the MSISDN that is enabled before the call is completed. The proxy 108 updates the MDB 110 to change the MSISDN that is enabled (shown in FIG. 4 as a circled "3"). The proxy 108 also causes a message to be sent to the UE 102 to indicate the change to enable MSISDN2 for calling (shown in FIG. 4 as a circled "4"). Updating the UE 102 may not be performed, and the call may be completed without updating the UE 102. Further to cause a change in the MSISDN that is enabled, the proxy 108 sends a MAP ISD message for MSISDN2 to the MSC/VLR 104 (shown with a circled "5" in FIG. 4) to update the MSC/VLR 104 with the subscriber information, including the called MSISDN2 that is now currently enabled. The proxy 108 thereby causes the MSC/VLR 104 to associate the IMSI stored on the UE 102 with the newly enabled MSISDN that is being called. In the example illustrated in FIG. 4, the MSC/VLR 104 updates its associations to associate IMSI1 with MSISDN2. In this communication, the proxy 108 emulates the HLR 106.

The proxy 108 transmits a request for the routing information to the MSC/VLR 104. In the example shown in FIG. 4, the proxy 108 sends a PRN message for the now-enabled MSISDN2 to the MSC/VLR 104 (shown in FIG. 4 with a circled "6"). The MSC/VLR 104 replies with a MSRN message (shown with a circled "7" in FIG. 4) with a MSRN that it associated temporarily with MSISDN2. The proxy 108 receives this routing information. In this communication, the proxy 108 emulates the HLR 106.

The proxy 108 transmits the routing information to the HLR 106. In the example shown in FIG. 4, the proxy 108 transmits a PRN Response message with the MSRN to the HLR 106 (shown with a circled "8") in FIG. 4. In this communication, the proxy 108 emulates the MSC/VLR 104. The HLR 106 sends a PRN Response message with the MSRN to the gateway MSC 300 (shown with a circled "9" in FIG. 4). To establish the call, the gateway MSC 300 sends a SIP INVITE to the MSRN which would subsequently be routed to the proxy 108 (shown with a circled "10" in FIG. 4). In this communication, the proxy 108 emulates a MSC/VLR to the gateway MSC 300. The proxy 108 maps the MSRN back to the MSRN originally allocated by the MSC and sends a SIP INVITE to the MSC's MSRN which subsequently gets routed to the MSC/VLR 104 (shown with a circled "11") in FIG. 4. Alternatively, the call might be set up through a Signaling System No. 7 (SS7) network using an ISDN User Part (ISUP) Initial address message (IAM) to place the call. Also, the network operator could elect to not have the Proxy map the MSRN to its own to interwork the call and simply forward the MSRN sent by the MSC to the HLR. In this case the call would be routed to the MSC/VLR 104 that the MSRN came from, and would not traverse the proxy. The MSC/VLR 104 then sets up the call with the UE 102.

In the embodiments illustrated in FIGS. 1-4, the proxy 108 is a separate hardware network component that emulates various other devices in the network 100. In one or more alternative embodiments, the functionality of the proxy 108 may be incorporated into the HLR 106. In these embodiments, the HLR 106 causes the MSC/VLR 104 to associate the enabled MSISDN with the IMSI on the UE 102. The HLR updates the MDB 110 and/or the UE 102 when a call comes in on a non-enabled MSISDN, and so forth. The MDB 110 is shown as a separate component in FIGS. 1-4, as well, but in one or more embodiments, the MDB 110 is incorporated into the proxy 108 and/or the HLR 106. Other examples are possible without departing from the scope of embodiments.

The processes described above in association with FIGS. 1-4 can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. In other embodiments, hardware components perform one or more of the operations. Such hardware components may include or be incorporated into processors, application-specific integrated circuits (ASICs), programmable circuits such as field programmable gate arrays (FPGAs), or in other ways. The order in which the operations are described is not intended to be construed as a limitation, and any number of the described operations can be combined in any order and/or in parallel to implement the processes.

Figure 5:
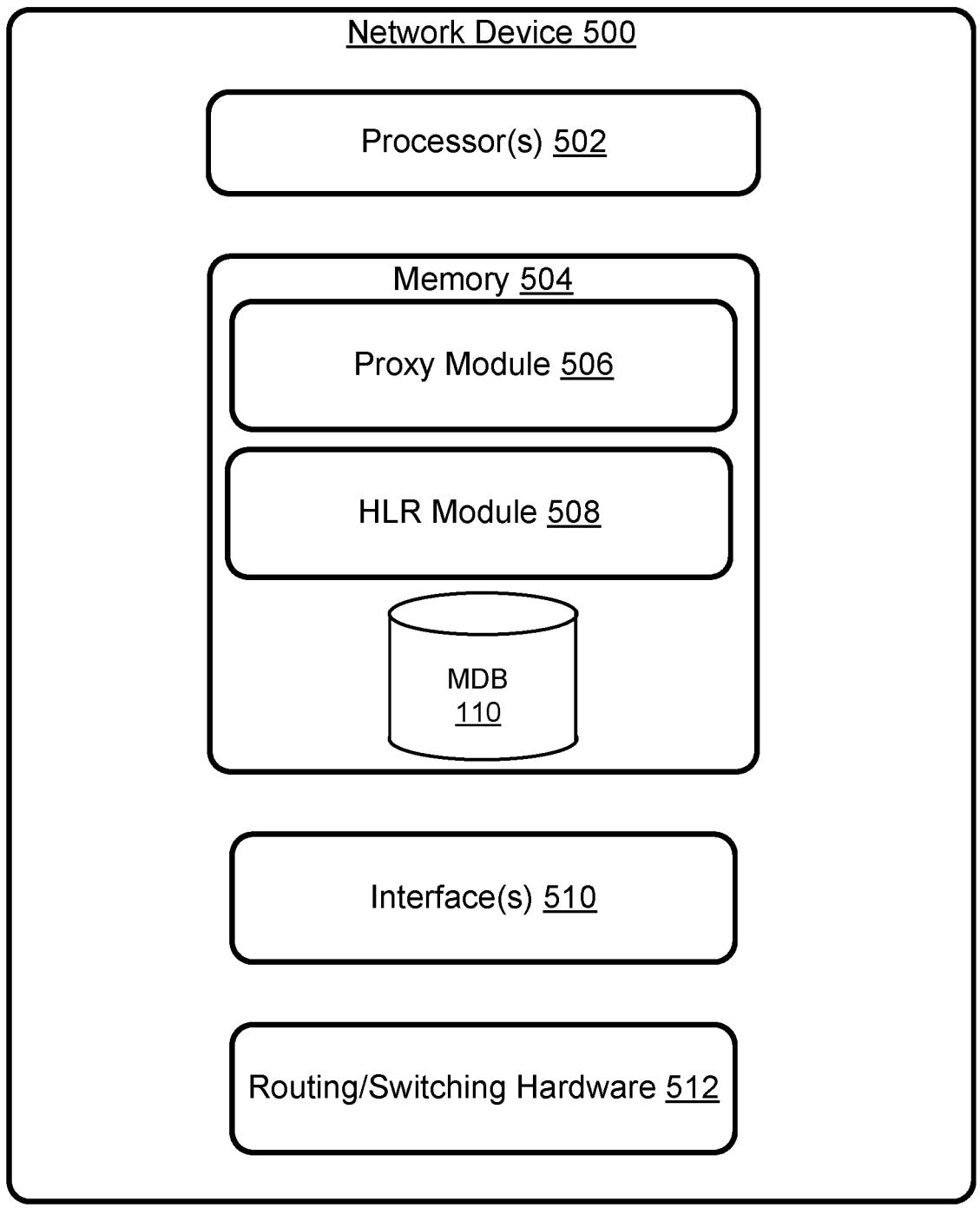
FIG. 5 illustrates an example network device configured to perform dynamic MSISDN association.

FIG. 5 illustrates an example network device 500 configured to perform dynamic MSISDN association. As illustrated in FIG. 5, the network device 500 includes processor(s) 502 and memory 504. A proxy module 506 is executable by the processor(s) 502 to perform various functions that are the same as or similar to the proxy 108 described in FIGS. 1-4. For example, the proxy module 506 is configured, among other things, to emulate an HLR when communicating with a MSC/VLR, to emulate an MSC/VLR when communicating with an HLR, to cause an MSC/VLR to associate a currently enabled MSISDN with an IMSI associated with a UE, and so forth.

As noted above, the proxy 108 and the HLR 106 depicted in FIGS. 1-4 may be incorporated into a single computing system. The HLR module 508 performs the functions of an HLR, such as the HLR 106. Similarly, the network device 500 may include the MDB 110. The network device 500 also includes interface(s) 510 that enable the network device 500 to communicate with other devices in a network, such as in a GSM network. Routing/switching hardware 512 provides routing and switching functionality, such as SS7 routing and switching capabilities, or other. The interface(s) 510 and/or the routing/switching hardware may include or be incorporated into processors, application-specific integrated circuits (ASICs), programmable circuits such as field programmable gate arrays (FPGAs), or in other ways.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method, comprising:
   storing, in a database accessible to a network proxy, information associating a mobile device with a plurality of Mobile Station International Subscriber Directory Numbers (MSISDNs), wherein the information identifies a first MSISDN as active and enabled for use in incoming and outgoing communications at the mobile device, and a second MSISDN as active but not enabled;
   updating, in response to a change message received from the mobile device, the database to indicate that the second MSISDN is active and enabled and that the first MSISDN is active but not enabled;
   causing, based at least on the database being updated in response to the change message, an update message to be transmitted to the network proxy, the update message comprising an indication that the first MSISDN is to be disabled and the second MSISDN is to be enabled for the mobile device; and
   in response to updating the database, associating the second MSISDN with the mobile device at a mobile network switch by transmitting subscriber data associated with the second MSISDN from the network proxy to the mobile network switch.

2. The method of claim 1, further comprising receiving, by the network proxy, an indication that the mobile network switch has associated the mobile device with the second MSISDN.

3. The method of claim 1, wherein the network proxy emulates a home location register when sending the subscriber data to the mobile network switch.

4. The method of claim 3, wherein the network proxy emulates the home location register by transmitting the subscriber data associated with the second MSISDN in a mobile application part insert subscriber message.

5. The method of claim 1, wherein the network proxy obtains the subscriber data associated with the second MSISDN and other subscriber data associated with the first MSISDN from a home location register during a registration process for the mobile device.

6. The method of claim 5, wherein the network proxy emulates the mobile network switch when obtaining the subscriber data and the other subscriber data from the home location register.

7. The method of claim 1, wherein the change message is received from an application executing on the mobile device that includes a user interface for receiving a user selection indicating which of the first MSISDN and the second MSISDN is to be active and enabled for use in the incoming and outgoing communications, wherein the application is configured to send the change message to the database in response to the user selection.

8. The method of claim 1, wherein the first MSISDN and the second MSISDN are associated with different international mobile subscriber identities (IMSIs).

9. The method of claim 8, wherein the first MSISDN is associated with a first IMSI stored in a subscriber identity module (SIM) of the mobile device and the second MSISDN is associated with a second IMSI that is not stored in the SIM of the mobile device.

10. A telecommunication network, comprising:
a network proxy; and
a database associated with the network proxy that stores information associating a mobile device with a plurality of Mobile Station International Subscriber Directory Numbers (MSISDNs), the information identifying a first MSISDN as active and enabled for use in incoming and outgoing communications at the mobile device, and a second MSISDN as active but not enabled,
wherein the database is configured to perform an update, in response to a change message from the mobile device, to change the information to indicate that the second MSISDN is active and enabled and that the first MSISDN is active but not enabled,
wherein the database is further configured to transmit an update message to the network proxy, the update message comprising an indication that the first MSISDN is to be disabled and the second MSISDN is to be enabled for the mobile device; and
wherein the network proxy is configured to, in response to the update message, transmit subscriber data associated with the second MSISDN to a mobile network switch to associate the second MSISDN with the mobile device at the mobile network switch.

11. The telecommunication network of claim 10, wherein the network proxy is configured to receive an indication that the mobile network switch has associated with mobile device with the second MSISDN.

12. The telecommunication network of claim 10, wherein the network proxy is configured to emulate a home location register when sending the subscriber data to the mobile network switch.

13. The telecommunication network of claim 10, wherein the network proxy is configured to obtain the subscriber data associated with the second MSISDN and other subscriber data associated with the first MSISDN from a home location register during a registration process for the mobile device.

14. The telecommunication network of claim 10, wherein the change message is received by the database from an application executing on the mobile device that includes a user interface for receiving a user selection indicating which of the first MSISDN and the second MSISDN is to be active and enabled for use in the incoming and outgoing communications, wherein the application is configured to send the change message to the database in response to the user selection.

15. The telecommunication network of claim 10, wherein the first MSISDN and the second MSISDN are associated with different international mobile subscriber identities (IMSIs).

16. One or more non-transitory computer-readable media storing computer-executable instructions that, when executed by one or more processors of one or more network devices of a telecommunication network, cause the one or more network devices to perform operations comprising:
storing information associating a mobile device with a plurality of Mobile Station International Subscriber Directory Numbers (MSISDNs), wherein the information identifies a first MSISDN as active and enabled for use in incoming and outgoing communications at the mobile device, and a second MSISDN as active but not enabled;
updating, in response to a change message received from the mobile device, the information to indicate that the second MSISDN is active and enabled and that the first MSISDN is active but not enabled;
transmitting, based at least on the change message, an update message to be transmitted to a network proxy, the update message comprising an indication that the first MSISDN is to be disabled and the second MSISDN is to be enabled for the mobile device; and
causing, in response to updating the information, the network proxy to associate the second MSISDN with the mobile device at a mobile network switch by transmitting subscriber data associated with the second MSISDN to the mobile network switch.

17. The one or more non-transitory computer-readable media of claim 16, wherein the operations further comprise receiving an indication that the mobile network switch has associated the mobile device with the second MSISDN.

18. The one or more non-transitory computer-readable media of claim 16, wherein the subscriber data associated with the second MSISDN is transmitted in a mobile application part insert subscriber message to emulate a home location register sending the subscriber data to the mobile network switch.

19. The one or more non-transitory computer-readable media of claim 16, wherein the change message is received from an application executing on the mobile device that includes a user interface for receiving a user selection indicating which of the first MSISDN and the second MSISDN is to be enabled for use in the incoming and outgoing communications, wherein the application is configured to send the change message in response to the user selection.

20. The one or more non-transitory computer-readable media of claim 16, wherein the first MSISDN and the second MSISDN are associated with different international mobile subscriber identities (IMSIs).

* * * * *